March 7, 1967 A. MASSEN ETAL 3,307,674
EMBOSSING TOOLS WITH INTERCHANGEABLE EMBOSSING MEANS
AND PAWL NORMALLY DISENGAGED FROM RATCHET
Filed Aug. 31, 1965 2 Sheets-Sheet 1
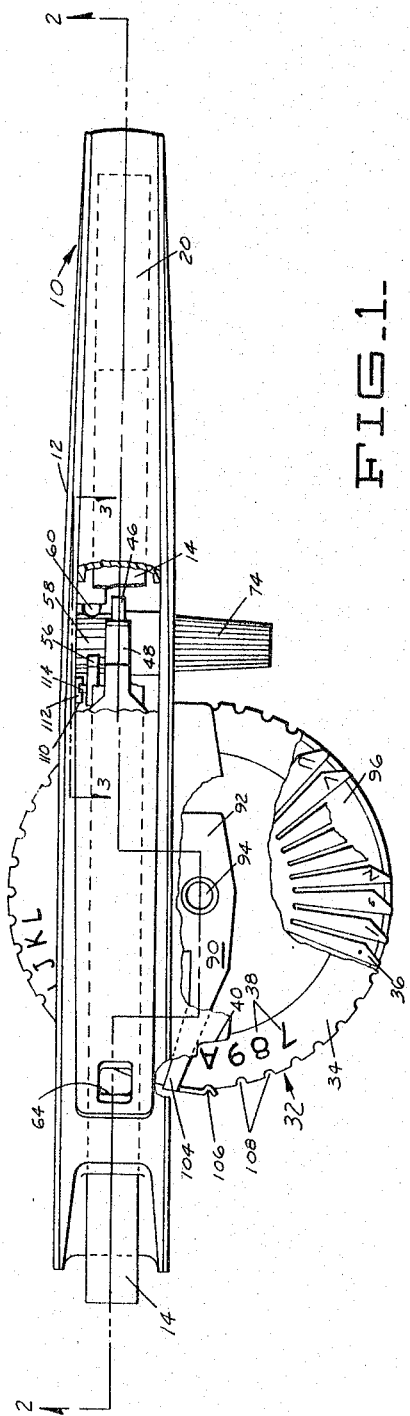
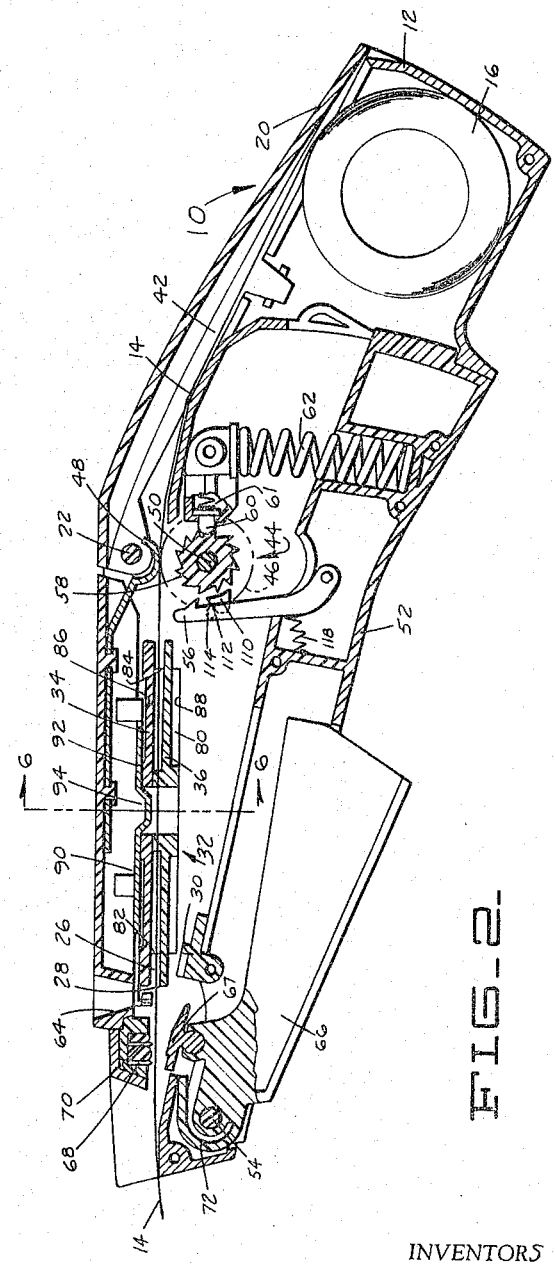
INVENTORS
ARMAND MASSEN
BY HERBERT D. PACE, JR.
Samuelson & Jacob
THEIR ATTORNEYS

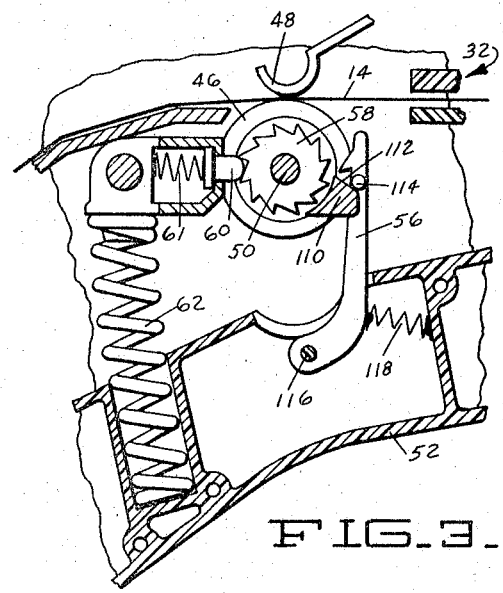
FIG_3_
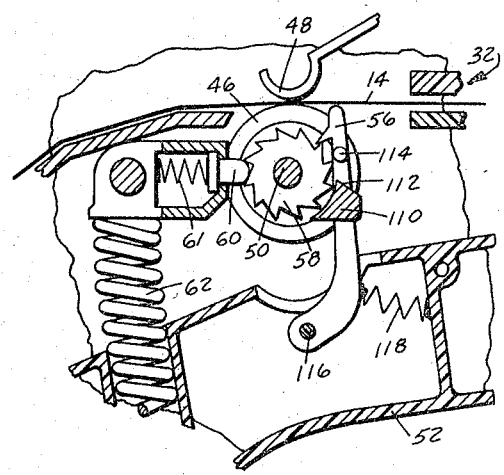
FIG_4_
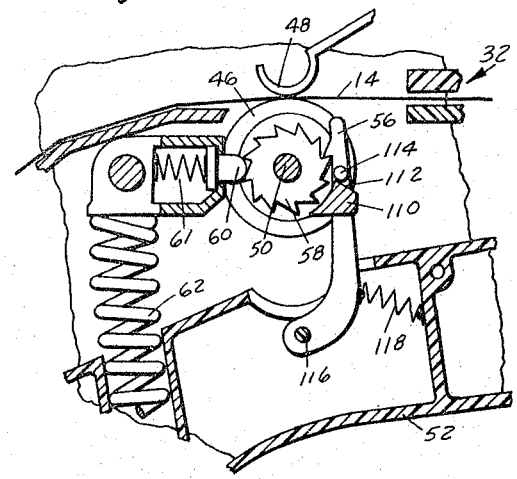
FIG_5_
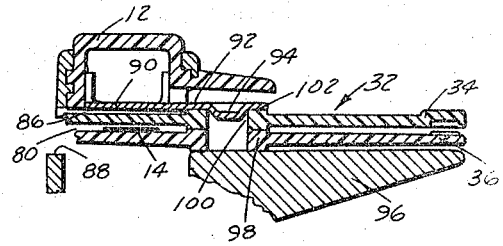
FIG_6_
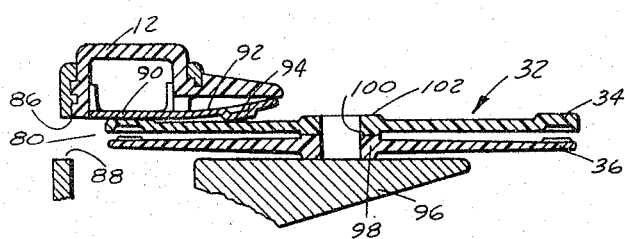
FIG_7_ though there is a variety of thermoplastic resins currently
United States Patent Office 3,307,674
Patented Mar. 7, 1967

3,307,674
EMBOSSING TOOLS WITH INTERCHANGEABLE EMBOSSING MEANS AND PAWL NORMALLY DISENGAGED FROM RATCHET
Armand Massen, San Rafael, and Herbert D. Pace, Jr., Sunland, Calif., assignors to Dymo Industries, Inc., Emeryville, Calif., a corporation of California
Filed Aug. 31, 1965, Ser. No. 484,040
9 Claims. (Cl. 197—6.7)

The present invention relates generally to embossing tools for embossing strip material and pertains, more specifically, to such tools wherein a strip of embossable material is advanced through the body of the tool from a strip supply toward an embossing station in the body and which include means for providing readily interchangeable embossing means at the embossing station and facilitating the interchange of the embossing means by providing for the retraction of the strip material from the embossing station toward the supply.

A variety of embossing tools are presently available for establishing embossments in strips of embossable material in the fabrication of labels, signs, plates, tags, and the like. More recently, such tools have been developed for embossing various indicia on thin plastic strips formed of sheeted thermoplastic resins which are capable of being cold-formed to establish a contrast color relief enfigurement therein. Usually, the tools employ embossing means for establishing the desired embossments, a supply of strip material and means for feeding the strip material from the supply to the embossing means. The strip material is usually in the form of an elongated flexible tape supplied in a coil placed in the body of the tool.

It has been found convenient as well as practical to provide tools as described above with interchangeable embossing means so that any one tool can be employed to emboss indicia of a variety of styles and types thereby reducing the amount of embossing equipment necessary for the desired variety.

It is therefore an object of the invention to provide embossing tools in which the embossing means are readily interchangeable with further embossing means so as to provide a variety of styles and types of indicia which may be embossed by such tools.

Another object of the invention is to provide means by which the interchange of embossing means in embossing tools of the type described is facilitated.

A further object of the invention is to provide means in an embossing tool, which means permit the interchange of embossing means without requiring extensive dismantling of components of the tool in order to accomplish such an interchange.

A still further object of the invention is to provide means by which a strip of embossable material is advanced toward and is selectively retractable from the embossing station in an embossing tool to facilitate the interchange of embossing means located at the embossing station.

Still another object of the invention is to provide a tool as described above having a simplified design, ease of operation and being capable of providing improved performance without a concomitant increase in complexity.

The invention may be described briefly as a tool for embossing strip material wherein a strip of embossable material is advanced through the body of the tool from a strip supply toward an embossing station in the body in response to the operation of actuating means movable between a first position and a second position for actuating embossing means at the embossing station, the tool including means for providing readily interchangeable embossing means at the embossing station and facilitating the interchange of these embossing means by providing for the selective retraction of the strip material from the embossing station toward the supply. The above means include means for gripping the strip, the gripping means being selectively movable in a first direction for advancing the strip and in a second direction for retracting the strip, advancing means responsive to the movement of the actuating means for moving the gripping means in the first direction, means for engaging the advancing means with the gripping means during movement of the actuating means from the second position to the first position, means for disengaging the advancing means from the gripping means upon return movement of the actuating means to the second position, and means for selectively moving the gripping means in the second direction when the advancing means is disengaged therefrom. In addition, the means for facilitating the interchange of the embossing means may include a slot in the body of the tool communicating with the embossing station and the exterior of the body and first detent means fixed in the body adjacent the embossing station, the embossing means being receivable within the slot and having second detent means for cooperatively engaging the first detent means, the second detent means being located so as to accurately position selected embossing means at the embossing station.

The invention will be more fully understood and further objects and advantages thereof will become apparent in the following detailed description of an embodiment of the invention illustrated in the accompanying drawings, in which:

FIGURE 1 is a top plan view of a hand operated embossing tool constructed in accordance with the invention, portions of which are cut away to reveal internal details;

FIGURE 2 is a side elevational cross-sectional view taken along line 2—2 of FIGURE 1;

FIGURE 3 is an enlarged fragmentary cross-sectional view taken along line 3—3 of FIGURE 1;

FIGURES 4 and 5 are views similar to FIGURE 3 but showing the component parts in different operating positions;

FIGURE 6 is an enlarged fragmentary cross-sectional view taken along line 6—6 of FIGURE 2; and FIGURE 7 is a view similar to FIGURE 6 with the component parts in another position.

Referring to the drawings, a hand operated embossing tool is indicated generally at 10 in FIGURES 1 and 2. Tool 10 has a body or housing 12 which has a general configuration adapted to make the tool easily operated while being held in one hand. The tool is designed to emboss selected indicia in an elongated strip of embossable material such as the variety of thermoplastic resins currently available in the form of plastic tapes of various widths. As seen in FIGURE 2, an embossable tape 14 is supplied in the form of a coil or roll 16 which is received within the housing 12 through a door 20 in the housing hinged thereto at 22.

Embossing of the tape 14 is accomplished at an embossing station 26 wherein there is located embossing means shown in the form of an embossing die set 28 actuated by a reciprocating actuating member 30. Die set 28 is one of a series of die sets located in the periphery of selector wheel 32 which is rotatably mounted in housing 12 in a manner which will be explained below so that any one of the series of die sets can be located at the embossing station 26 to emboss selected indicia in the tape 14. Selector wheel 32 is made up of upper and lower disks 34 and 36, respectively, one of which carries the die and the other of which carries the punch of each die set. Disks 34 and 36 are interlocked with one another so that both will rotate together upon rotation of selector wheel 32. As best seen in FIGURE 1, the upper disk 34 is provided with visible characters 38 on the outer face thereof corresponding to the indicia which can be embossed by the selectable die sets. The visible characters are also located along the periphery of the selector wheel, but are circumferentially displaced from their corresponding die sets so that when a particular die set is located at the embossing station 26, the corresponding visible character is located at a selector slot 40 provided in the housing 12.

Tape 14 is fed from supply roll 16 through a duct 42 toward the embossing station 26 by feed means 44 which comprises a feed roll 46 which frictionally grips the tape where a leaf spring 48 presses the tape against the surface of the roll and advances the tape in prescribed increments by being rotated in a counterclockwise direction (as seen in FIGURE 2) along with shaft 50 upon which roll 46 is mounted, shaft 50 being journaled in the housing, all as will be explained hereinafter.

Embossing of tape 14 is accomplished by displacing actuating means illustrated in the form of lever 52, which is pivotally mounted to housing 12 at 54, in a counterclockwise direction to depress lever 52 and bring actuating member 30 vertically upwardly into contact with a portion of lower disk 36 and continuing such rotation until member 30 actuates the die set 28 positioned at the embossing station 26 and an embossment is established in the tape. At the same time, a pawl 56 is moved vertically upwardly to engage the next successive tooth of a ratchet wheel 58 which is operatively interengaged with feed roll 46 such that rotation of the ratchet wheel will rotate the feed roll. Rotation of ratchet wheel 58 is precluded during the upward movement of pawl 56 by virtue of detent 60 which resiliently engages further teeth of the ratchet wheel by virtue of the resilient urging of detent spring 61. During the counterclockwise depression of actuating lever 52, helical spring 62 is compressed so that upon completion of the embossing operation and release of actuating lever 52, the lever 52 is urged back to its starting or rest position by spring 62 with a force sufficient to assure that pawl 56 will rotate ratchet wheel 58 in a counterclockwise direction against the deterrent of the detent 60 to rotate feed roll 46 and advance tape 14 through the increment necessary to index the tape for a subsequent embossment. Detent 60 further serves to accurately define the desired increment of rotation so that the tape is automatically indexed a length sufficient to accurately locate each successive embossment on the tape. A window 64 is provided in order to enable the embossed indicia to be viewed immediately after the completion of the embossing operation and the advancement of the tape.

Upon completion of the particular embossed article, the article may be severed from the tape by the displacement, or depression, of a second actuating lever or bar 66, which is also mounted for pivotal movement at 54, in a counterclockwise direction. Such displacement will move an anvil member 67 upwardly to bring tape 14 into contact with cutting blades 68 and 170 fixed in the housing. Anvil member 67 is pivotally mounted in bar 66 as shown in FIGURE 2 so that upon such upward movement, the anvil member will press tape 14 against cutting blades 68 and 70. Blade 70 will then sever the tape while blade 68 will establish a tab at the severed end of the completed embossed article for facilitating the subsequent removal of a backing strip which is generally present as a part of the embossable strip material. A leaf spring 72 will return actuating bar 66 and anvil member 67 back to their normal starting positions shown in FIGURE 2. A knob 74 (FIGURE 1) is operatively connected to shaft 50 for manually rotating feed roll 46 whenever it is desired to advance or retract tape 14 without actuating lever 52 as will be explained hereinafter.

The embossing means provided at embossing station 26 in the form of selectable die sets in selector wheel 32 are interchangeable by virtue of selector wheel 32 being removable and being capable of replacement by a like selector wheel having die sets for establishing embossments of a different style or type in tape 14. Housing 12 is provided with a slot 80 which communicates with embossing station 26 and the exterior of housing 12 and is complementary to selector wheel 32 for receiving the selector wheel within the housing. Thus, slot 80 extends along a length from a forward end 82 to a rearward end 84 corresponding to a chord of the selector wheel 32 and has a fixed width between upper and lower opposite sides 86 and 88, respectively, corresponding to the thickness of the selector wheel. A plate-like member 90 of flexible material is fixed at the upper side of slot 80 (see FIGURES 6 and 7) and extends laterally to establish a cantilever structure in the nature of a leaf spring 92. A portion of the leaf spring structure 92 is depressed to provide a first detent means in the form of a downwardly extending projection 94 which is located a distance from embossing station 26 equal to the radial distance between the center of selector wheel 32 and the die sets adjacent the periphery thereof. A platform 96 extends outwardly from the lower side of the slot 80 and receives a central boss 98 of the selector wheel 32 which rests upon the platform. A second detent means is provided in the form of a socket 100 established at the center of the selector wheel by means of central aperture in the wheel which has a diameter corresponding to the diameter of projection 94 and receives the projection therein as illustrated in FIGURES 1, 2 and 6. Thus, selector wheel 32 is retained within slot 80 in the housing 12 of the tool by the cooperation of projection 94 and socket 100. Bearing surfaces are provided in selector wheel 32 at boss 98 and an opposite boss 102 which cooperate with platform 96 and member 90, respectively, to allow rottaion of selector wheel 32 while the wheel is accurately maintained in place in the tool.

Selector wheel 32 is readily removed from the tool by merely pulling the wheel out of the slot 80 as shown in FIGURE 7. The flexibility of the material of member 90 coupled with the tapered or frusto-conical configuration of the projection 94 will permit ready resilient upward bending of leaf spring 92 to release the projection from socket 100 and enable the selector wheel to be removed without the necessity for dismantling any component parts of the tool. The cooperating detent means provided by the projection and socket also allow easy insertion of a selector wheel into the slot and positive accurate location and retention thereof within the slot with a minimum of effort and complexity. Arm 104 (FIGURE 1) of the plate-like member 90 provides an additional detent at 106 which cooperates with any one of a plurality of notches 108 in the perimeter of the upper disk 34 of selector wheel 32 to retain the wheel at a chosen angular position.

It is noted that the construction and operation of the tool 10 requires that tape 14 pass between the upper and lower disks 34 and 36 of selector wheel 32 on the path to the embossing station 26. Since the tape- cut-off mechanism described above lies forward of the embossing station, a length of tape will always lie between the disks of the selector wheel upon completion of an embossed article. It will be apparent that the existence of a length of tape between the disks of a selector wheel which is to be removed may cause a problem during the removal of the wheel in that the tape may be snagged by one or more of the die sets at the periphery of the wheel and be pulled laterally causing damage to the tape as well as difficulty in the removal of the wheel. Likewise, the presence of a length of tape in slot 80 during the placement of a selector wheel into the slot could impede the insertion of a wheel into the slot as well as cause damage to the tape should the tape not be aligned so as to slip between the disks during such insertion.

In order to alleviate such difficulties, tool 10 is provided with means for permitting selective retraction of the tape from the embossing station 26 and from between the disks 34 and 36 so that the slot 80 will be clear of any length of tape 14 during removal or insertion of a selector wheel 32. Returning now to FIGURES 1 and 2, housing 12 is shown having a cam member 110 adjacent the ratchet wheel 58 and including a cam surface 112. Pawl 56 is provided with a follower 114 thereon which cooperatively engages cam surface 112 to move the pawl in a manner which is best described in connection with FIGURES 3 through 5.

As set forth above, pawl 56 is mounted to lever 52 for movement therewith during actuation of the lever 52. Pawl 56 is pivotally mounted upon lever 52 at 116 and is normally urged toward engagement with ratchet wheel 58 by resilient means shown in the form of a spring 118. However, when lever 52 is at its starting or rest position, as illustrated in FIGURE 3, the pawl is precluded from engagement with the ratchet wheel by virtue of the contact between cam surface 112 and follower 114. Upon depression of lever 52 to an actuated or depressed position, as illustrated in FIGURE 4, the cam surface no longer precludes the engagement of the pawl with the ratchet wheel and spring 118 urges the pawl into engagement with the ratchet wheel. Upon the return movement of lever 52 toward the rest position by helical spring 62, the pawl will rotate the ratchet wheel and feed roll 46 so as to advance tape 14 through the desired increment.

Upon completion of the increment of rotation of the ratchet wheel and feed roll, further travel of the lever 52 back to the rest position will engage follower 114 with cam surface 112 and the pawl will be drawn away from the ratchet wheel to disengage the pawl from the teeth of the ratchet wheel. Since the pawl is disengaged from the ratchet wheel when the lever arrives at the rest position, the knob 74 can be manually rotated to rotate the feed roll in a reverse direction without interference from the pawl and ratchet wheel mechanism to retract the tape from between the disks of the selector wheel. It is noted that detent 60 is provided with a spherical-surfaced end and detent spring 61 has a resilience such that forward or reverse rotation of feed roll 46 by manual rotation of knob 74 to either advance or retract tape 14 is accomplished with ease. Thus, the above described cam and follower mechanism provides means which serve to disengage the pawl and ratchet drive means of the feed mechanism so that the tape may be selectively retracted from the embossing station and from between the disks of the selector wheel to facilitate the interchange of the selector wheels in the tool.

It is understood that the foregoing detailed description of an embodiment of the invention is provided by way of example only. Various details of design and construction may be modified without departing from the true spirit and scope of the invention as set forth in the appended claims.

What is claimed is:

1. A tool for embossing strip material wherein a strip of embossable material is advanced through the body of the tool from a strip supply toward an embossing station in the body in response to the operation of actuating means movable between a first position and a second position for actuating embossing means at said embossing station, said tool including means for providing readily interchangeable embossing means mounted in the body for pivotal movement about an axis to allow the location of selected embossing means at said embossing station and facilitating the interchange of said embossing means by providing for the selective retraction of the strip material from the embossing station toward the supply, said means comprising:

means for gripping the strip, said gripping means being selectively movable in a first direction for advancing said strip toward the embossing station and in a second direction for retracting said strip from the embossing station;

advancing means responsive to the operation of said actuating means for moving said gripping means in said first direction;

means for engaging said advancing means from said gripping means during movement of said actuating means from said second position toward said first position;

means for disengaging said advancing means from said gripping means upon the arrival of said actuating means at said first position in response to the arrival of the actuating means at the first position;

means for selectively moving said gripping means in said second direction to retract the strip from the embossing station when said advancing means is disengaged;

a slot in said body communicating with the embossing station and the exterior of said body; and first resilient detent means fixed in said body adjacent said embossing station and displaced from the embossing station a distance equal to the displacement of said axis from the embossing station;

said embossing means being receivable within said slot and having second detent means for cooperatively engaging said first detent means, said second detent means being located at said axis so as to accurately position selected embossing means at the embossing station.

2. A tool for embossing strip material wherein a strip of embossable material is advanced through the body of the tool from a strip supply toward an embossing station in response to the operation of a lever pivotally mounted in the body for movement between a rest position and a depressed position to actuate embossing means at the embossing station, and a generally circular selector wheel is mounted in the body for rotation about an axis at the center thereof and carries a plurality of die sets adjacent the periphery thereof, any one of which die sets may be selectively positioned at the embossing station by rotation of the selector wheel, said tool including means for providing readily interchangeable selector wheels and facilitating the interchange of said selector wheels by providing for the selective retraction of the strip material from the embossing station toward the supply, said means comprising:

a feed roll journaled in said body for rotation in a first direction for advancing said strip toward the embossing station and in a second direction for retracting said strip from the embossing station;

feed roll drive means movable in response to operation of said lever;

resilient means normally urging said drive means into engagement with said feed roll when said lever is in said depressed position such that upon movement of the lever from the depressed position toward the rest position the drive means will rotate the feed roll in said first direction;

a cam surface in said body;

a follower associated with said drive means and said cam surface such that upon return movement of the lever from the depressed position toward the rest position the drive means will rotate the feed roll in said first direction until the cam surface moves the follower to disengage the drive means from the feed roll when the lever arrives at said rest position in response to the arrival of the lever at the rest position;

means associated with said feed roll for allowing selective rotation of the feed roll in said second direction to retract the strip from the embossing station when the drive means is disengaged from the feed roll;

a slot in said body communicating with the embossing station and the exterior of said body;

resilient detent means fixed in said body adjacent said slot and located a distance from the embossing station equal to the distance between the axis at the center of a selector wheel and the die sets therein; and means in said selector wheel at the center thereof for cooperatively releasably engaging said resilient detent means to releasably retain said selector wheel rotatably mounted in the body of the tool.

3. A tool for embossing strip material wherein a strip of embossable material is advanced through the body of the tool from a strip supply toward an embossing station in response to the operation of a lever pivotally mounted in the body for movement between a rest position and a depressed position to actuate embossing means at the embossing station, and a generally circular selector wheel is mounted in the body for rotation about an axis at the center thereof and carries a plurality of die sets adjacent the periphery thereof, any one of which die sets may be selectively positioned at the embossing station, said tool including means for providing readily interchangeable selector wheels and facilitating the interchange of said selector wheels by providing for the retraction of the strip material from the embossing station toward the supply, said means comprising:
- a feed roll journaled in said body for rotation in a forward direction for advancing said strip toward the embossing station and in a reverse direction for retracting said strip from the embossing station;
- a ratchet wheel fixed for rotation with said feed roll;
- a pawl fixed to said lever for movement therewith and engageable with said ratchet wheel;
- resilient means normally urging said pawl into engagement with said ratchet wheel when said levers in said depressed position such that upon movement of the lever from the depressed position toward said rest position the pawl will rotate the ratchet wheel and the feed roll in said forward direction;
- a cam surface in said body adjacent said pawl and said ratchet wheel;
- a follower associated with said pawl and said cam surface such that upon return movement of the lever from said depressed position toward said rest position the pawl will rotate the ratchet wheel and feed roll in said forward direction until the cam surface moves the follower away from the ratchet wheel to disengage the pawl therefrom when the lever arrives at said rest position in response to the arrival of the lever at the rest position;
- a knob associated with said feed roll for allowing selective rotation of the feed roll in said reverse direction to retract the strip from the embossing station when the pawl is disengaged from the ratchet wheel;
- a slot in said body having a length between ends corresponding to a chord of said circular selector wheel and a width between sides corresponding to the thickness of said wheel, said slot communicating with the embossing station and the exterior of said body;
- a platform in said body adjacent one side of said slot;
- a leaf spring fixed in said body adjacent the opposite side of said slot;
- a projection in said leaf spring located a distance from the embossing station equal to the distance between the axis at the center of each selector wheel and the die sets therein and extending in a direction from one side of said slot toward the opposite side and including a diameter transverse to said direction; and
- a socket in said selector wheel located at the center thereof and having a diameter corresponding to the diameter of said projection such that said selector wheel is received within said slot with a central portion thereof lying on said platform and said projection releasably engaging said socket to releasably retain said selector wheel rotatably mounted in the body of the tool.

4. In a tool for embossing strip material wherein a strip of embossable material is advanced through the body of the tool from a strip supply toward interchangeable embossing means in the body in response to the operation of actuating means movable between a first position and a second position for actuating said embossing means, and is selectively retractable from the embossing means toward the supply, means for permitting selective advancement or retraction of said strip, said means comprising:
- means for gripping the strip, said gripping means being selectively movable in a first direction for advancing said strip and in a second direction for retracting said strip;
- advancing means responsive to the operation of said actuating means for moving said gripping means in said first direction, said advancing means including a pawl in operative engagement with the actuating means and a ratchet wheel in operative engagement with the gripping means, said pawl normally being out of operative engagement with said ratchet wheel when the actuating means is in the first position and in operative engagement with said ratchet wheel the actuating means is in the second position;
- means for engaging said advancing means with said gripping means by operative engagement of the pawl with the ratchet wheel during movement of said actuating means from said second position toward said first position;
- means for disengaging said advancing means from said gripping means by movement of the pawl out of operative engagement with the ratchet wheel upon the arrival of said actuating means at said first position in response to the arrival of the actuating means at the first position; and
- means for selectively moving said gripping means in said second direction when said advancing means is disengaged from said gripping means.

5. In a tool for embossing strip material wherein a strip of embossable material is advanced through the body of the tool from a strip supply toward interchangeable embossing means in the body in response to the operation of a lever pivotally mounted in the body for movement between a rest position and a depressed position to actuate the embossing means, and is selectively retractable from the embossing means toward the supply, means for permitting selective advancement or retraction of said strip, said means comprising:
- a feed roll journaled in said body for rotation in a first direction for advancing said strip and in a second direction for retracting said strip;
- feed roll drive means movable in response to operation of said lever;
- resilient means normally urging said drive means into engagement with said feed roll when said lever is in said depressed position such that upon movement of the lever from the depressed position toward the rest position the drive means will retate the feed roll in said first direction;
- a cam surface in said body;
- a follower associated with said drive means and said cam surface such that upon return movement of the lever from the depressed position toward the rest position and drive means will retate the feed roll in said first direction until the cam surface moves the follower to disengage the drive means from the feed roll when the lever arrives at said rest position in response to the arrival of the lever at the rest position; and
- means associated with said feed roll for allowing rotation of the feed roll in said second direction when the drive means is disengaged from the feed roll.

6. In a tool for embossing strip material wherein a strip of embossable material is advanced through the body of the tool from a strip supply toward interchangeable embossing means in the body in response to the operation of a lever pivotally mounted in the body for movement between a rest position and a depressed position to actuate the embossing means, and is selectively retractable from the embossing means toward the supply, means for permitting selective advancement or retraction of said strip, said means comprising:

a feed roll journaled in said body for rotation in a forward direction for advancing said strip and in a reverse direction for retracting said strip;
a ratchet wheel fixed for rotation with said feed roll;
a pawl fixed to said lever for movement therewith and engageable with said ratchet wheel;
resilient means normally urging said pawl into engagement with said ratchet wheel when said lever is in said depressed position such that upon movement of the lever from the pressed position toward said rest position the pawl will rotate the ratchet wheel and the feed roll in said forward direction;
a cam surface in said body adjacent said pawl and said ratchet wheel;
a follower associated with said pawl and said cam surface such that upon return movement of the lever from said depressed position toward said rest position, the pawl will rotate the ratchet wheel and the feed roll in said forward direction until the cam surface moves the follower away from the ratchet wheel to disengage the pawl therefrom when the lever arrives at said rest position in response to the arrival of the lever at the rest positon; and
a knob associated with said feed roll for allowing selective rotation of the feed roll in said reverse direction when the pawl is disengaged from the ratchet wheel.

7. In a tool for embossing strip material wherein a strip of embossable material is advanced through the body of the tool from a strip supply toward an embossing station in the body and is selectively retractable from the embossing station toward the supply, means for providing readily interchangeable embossing means mounted in the body for pivotal movement about an axis to allow the location of selected embossing means at said embossing station, said means comprising:

a slot in said body communicating with the embossing station and the exterior of said body; and
first resilient detent means fixed in said body adjacent said embossing station and displaced from the embossing station a distance equal to the displacement of said axis from the embossing station;
said embossing means being receivable within said slot and having second detent means for cooperatively engaging said first detent means, said second detent means being located at said axis so as to accurately position selected embossing means at the embossing station.

8. In a tool for embossing strip material wherein a strip of embossable material is advanced through the body of the tool from a strip supply toward an embossing station in the body and is selectively retractable from the embossing station toward the supply, and wherein a generally circular selector wheel is mounted in said body for rotation about an axis at the center thereof and carries a plurality of die sets adjacent the periphery thereof, any one of which die sets may be selectively positioned at the embossing station by rotation of the selector wheel, means for readily interchanging said selector wheel with another having another plurality of die sets similarly located therein, said means comprising:

a slot in said body communicating with the embossing station and the exterior of said body;
resilient detent means fixed in said body adjacent said slot and located a distance from the embossing station equal to the distance between the axis at the center of a selector wheel and the die sets therein;
means in said selector wheel at the center thereof for cooperatively releasably engaging said resilient detent means to releasably retain said selector wheel rotatably mounted in the body of the tool.

9. In a tool for embossing strip material wherein a strip of embossable material is advanced through the body of the tool from a strip supply toward an embossing station in the body and is selectively retractable from the embossing station toward the supply, and wherein a generally circular selector wheel is mounted in said body for rotation about an axis at the center thereof and carries a plurality of die sets adjacent the periphery thereof, any one of which die sets may be selectively positioned at the embossing station, means for readily interchanging said selector wheel with another having another plurality of die sets similarly located therein, said means comprising:

a slot in said body having a length between ends corresponding to a chord of said circular selector wheel and a width between sides corresponding to the thickness of said wheel, said slot communicating with the embossing station and the exterior of said body;
a platform in said body adjacent one side of said slot;
a leaf spring fixed in said body adjacent the opposite side of said slot;
a projection in said leaf spring located a distance from the embossing station equal to the distance between the axis at the center of each selector wheel and the die sets therein and extending in a direction from one side of said slot toward the opposite side and including a diameter transverse to said direction; and
a socket in said selector wheel located at the center thereof and having a diameter corresponding to the diameter of said projection such that said selector wheel is received within said slot with a central portion thereof lying on said platform and said projection releasably engaging said socket to releasably retain said selector wheel rotatably mounted in the body of the tool.

References Cited by the Examiner
UNITED STATES PATENTS

| | | | |
|---|---|---|---|
| 2,979,179 | 4/1961 | Anglim et al. | 197—6.7 |
| 3,083,807 | 4/1963 | Travaglio | 197—6.7 |
| 3,127,989 | 4/1964 | Travaglio | 197—6.7 |
| 3,129,800 | 4/1964 | Bogeaus | 197—6.7 |
| 3,239,048 | 3/1966 | Bogeaus | 197—6.7 |

ROBERT E. PULFREY, *Primary Examiner.*

E. S. BURR, *Assistant Examiner.*

UNITED STATES PATENT OFFICE
CERTIFICATE OF CORRECTION

Patent No. 3,307,674                                        March 7, 1967

Armand Massen et al.

It is hereby certified that error appears in the above numbered patent requiring correction and that the said Letters Patent should read as corrected below.

Column 3, line 56, for "170" read -- 70 --; column 4, line 33, for "rottaion" read -- rotation --; column 6, line 1, for "from" read -- with --; column 7, line 27, for "resilent" read -- resilient --; line 28, for "levers" read -- lever is --; line 38, before "feed" insert -- the --; column 8, line 19, after "wheel" insert -- when --; line 54, for "retate" read -- rotate --; line 60, for "and" read -- the --; same line 60, for "retate" read -- rotate --; column 9, line 13, for "pressed" read -- depressed --; line 23, for "fram" read -- from --.

Signed and sealed this 7th day of November 1967.

(SEAL)
Attest:

EDWARD M. FLETCHER, JR.                       EDWARD J. BRENNER
Attesting Officer                                 Commissioner of Patents